United States Patent
Barak et al.

(10) Patent No.: US 8,190,085 B2
(45) Date of Patent: May 29, 2012

(54) SIGNAL POWER SUMMATION USING SATELLITE TRANSPONDERS HAVING ORTHOGONAL POLARIZATIONS

(75) Inventors: Ilan Barak, Kfar-Saba (IL); Danny Spirtus, Holon (IL)

(73) Assignee: AT&T Intellectual Property I, L.P., Atlanta, GA (US)

( * ) Notice: Subject to any disclaimer, the term of this patent is extended or adjusted under 35 U.S.C. 154(b) by 385 days.

(21) Appl. No.: 12/626,646

(22) Filed: Nov. 26, 2009

(65) Prior Publication Data

US 2010/0136902 A1    Jun. 3, 2010

Related U.S. Application Data

(60) Provisional application No. 61/118,450, filed on Nov. 27, 2008.

(51) Int. Cl.
*H04B 7/185* (2006.01)

(52) U.S. Cl. ...... 455/12.1; 455/427; 455/13.4; 455/13.3

(58) Field of Classification Search .............. 455/12.1, 455/278.1, 295, 63.3, 63.1, 67.11, 69, 13.2, 455/427, 75, 3.02, 429, 13.3, 13.4; 342/361, 342/362

See application file for complete search history.

(56) References Cited

U.S. PATENT DOCUMENTS

| | | | |
|---|---|---|---|
| 5,943,606 A * | 8/1999 | Kremm et al. ............ 455/12.1 |
| 6,694,137 B2 | 2/2004 | Sharon | |
| 6,807,222 B1 | 10/2004 | Widdowson | |
| 2003/0179137 A1 * | 9/2003 | White et al. ............ 455/278.1 |
| 2003/0214449 A1 | 11/2003 | King | |
| 2003/0222778 A1 | 12/2003 | Piesinger | |
| 2005/0089086 A1 | 4/2005 | Hwang et al. | |
| 2005/0113040 A1 | 5/2005 | Walker et al. | |
| 2008/0172593 A1 | 7/2008 | Rainish et al. | |
| 2009/0061760 A1 | 3/2009 | Barak et al. | |
| 2009/0262757 A1 | 10/2009 | Rainish | |
| 2011/0306293 A1 * | 12/2011 | Miller .................. 455/12.1 |

FOREIGN PATENT DOCUMENTS

| | | |
|---|---|---|
| EP | 1211839 A2 | 6/2002 |
| EP | 1826937 A1 | 8/2007 |
| WO | 03050992 A1 | 6/2003 |

OTHER PUBLICATIONS

Lou et al., "FEC Scheme for a TDM-OFDM Based Satellite Radio Broadcasting System", IEEE Transactions on Broadcasting, IEEE Service Center, vol. 46, No. 1, Piscataway, NJ, USA, Mar. 2000.
EP07121667, Partial European Search Report dated Apr. 9, 2008.

(Continued)

*Primary Examiner* — John J Lee
(74) *Attorney, Agent, or Firm* — D. Kligler I.P. Services Ltd.

(57) ABSTRACT

A method for communication includes transmitting first and second copies of a signal toward first and second satellite transponders, respectively, so as to cause the first and second satellite transponders to transmit respective first and second downlink signals with mutually-orthogonal linear polarizations toward a coverage region. A correction is applied to at least one of the first and second copies before transmitting the first and second copies. The correction is selected so as to remove a frequency offset between the first and second downlink signals and cause the first and second downlink signals to have a constant phase offset in at least some of the coverage region.

24 Claims, 5 Drawing Sheets

OTHER PUBLICATIONS

"Framing Structure, channel coding and modulation for Satellite Services to Handheld devices (Sh) below 3GHz", DVB document A111 Revision 1, Jul. 2007, www.dvb.org.

Ernst et al., "Transport Layer Coding for the Land Mobile Satellite Channel", Proceedings of the 2004 59th IEEE Vehicular Technology Conference (VTC-2004), vol. 5, pp. 2916-2920, Milan, Italy, May 17-19, 2004.

Eberlein et al., "Double Use of the Link Margin—Advanced Physical Layer for Satellite Broadcast to Mobile Users", Proceedings of the 2005 Joint Conference (11th Ka and Broadband Communications Conference and 23rd International Communications Satellite Systems Conference), Rome, Italy, Sep. 25-28, 2005.

Eberlein et al., "Comparison of Physical Later Interleaving to Upper Layer Interleaving", Proceedings of the Seventh Workshop on Digital Broadcasting, Erlangen, Germany, Sep. 14-15, 2006.

Wu et al., "Scalable Video Coding and Transport over Broadband Wireless Networks", Proceedings of the IEEE, vol. 89, issue 1, pp. 6-20, Jan. 2001.

Schierl et al., "Wireless Broadcasting Using the Scalable Extension of H.264/AVC", IEEE International Conference on Multimedia and Expo (ICME-2005), pp. 884-887, Amsterdam, The Netherlands, Jul. 6-8, 2005.

Heuberger et al., Digital Broadcasting to Mobile Users in the 12 GHz-Band, Proceedings of the Anniversary Symposium 20 years Fraunhofer IIS—Microelectronics Applications for Information and Communication Technology, pp. 40-41, Erlangen, Germany, Jul. 1, 2005.

Kraus, J.D., "Antennas", second edition, pp. 70-73, Tata McGraw-Hill Publishing Company Limited, India, 1997.

EP Application No. 09157891.4 Search Report dated Jul. 30, 2009.

U.S. Appl. No. 11/374,049 Official Action dated Aug. 7, 2009.

EP07121667.5 European Search Report dated Jul. 4, 2008.

* cited by examiner

SIGNAL POWER SUMMATION USING SATELLITE TRANSPONDERS HAVING ORTHOGONAL POLARIZATIONS

CROSS-REFERENCE TO RELATED APPLICATIONS

This application claims the benefit of U.S. Provisional Patent Application 61/118,450, filed Nov. 27, 2008, whose disclosure is incorporated herein by reference.

FIELD OF THE INVENTION

The present invention relates generally to satellite communication, and particularly to methods and systems for transmitting signals via multiple satellite transponders.

BACKGROUND OF THE INVENTION

Satellite communication is used in a wide variety of systems and applications. For example, satellite communication can be used for transmitting digital video or for providing high-speed Internet access to mobile terminals. Some known satellite communication systems transmit signals jointly via two satellite transponders. For example, U.S. Pat. No. 6,694,137, whose disclosure is incorporated herein by reference, describes a communication system that causes a pair of satellite transponders produce a circularly-polarized signal. Uplink signals are provided to dedicated paired transponders on geostationary satellites. The uplink signals contain broadcast data and correction factors that maintain a high degree of purity in the quality of the circular polarization of the signal received on the ground.

SUMMARY OF THE INVENTION

An embodiment of the present invention provides a method for communication, including:

transmitting first and second copies of a signal toward first and second satellite transponders, respectively, so as to cause the first and second satellite transponders to transmit respective first and second downlink signals with mutually-orthogonal linear polarizations toward a coverage region; and before transmitting the first and second copies, applying to at least one of the first and second copies a correction, which is selected so as to remove a frequency offset between the first and second downlink signals and cause the first and second downlink signals to have a constant phase offset in at least some of the coverage region.

In some embodiment, a combined signal generated by a combination of the first and second downlink signals in the at least some of the coverage region includes a linearly-polarized signal. In an embodiment, the correction includes a phase correction, a frequency correction and/or a delay correction. In a disclosed embodiment, applying the correction includes compensating for a relative frequency error between local oscillators of the first and second satellite transponders.

In another embodiment, applying the correction includes receiving the first and second downlink signals, comparing the received first and second downlink signals so as to estimate the correction, and applying the estimated correction to the at least one of the first and second copies. Comparing the received first and second downlink signals may include mixing the received first and second downlink signals using a phase comparator so as to estimate a phase difference between the received first and second downlink signals. In an embodiment, applying the correction includes adjusting a frequency source used for up-converting the at least one of the first and second copies for transmission.

In some embodiments, the method includes receiving and decoding a combined signal, generated by a combination of the first and second downlink signals, by a given receiver having a linearly-polarized antenna in the coverage region. In an embodiment, each of the first and second downlink signals separately is received at the given receiver below a specified sensitivity level, and applying the correction includes causing the combined signal to be received at the given receiver above the specified sensitivity level. In a disclosed embodiment, receiving the combined signal includes orienting the linearly-polarized antenna of the given receiver to match a polarization inclination of the combined signal. Additionally or alternatively, receiving the combined signal includes orienting the linearly-polarized antenna of the given receiver to match an elliptical polarization of the combined signal.

In some embodiments, transmitting the copies includes transmitting multiple sets of the first and second copies of multiple respective signals, so as to cause the first and second satellite transponders to transmit respective multiple groups of the first and second downlink signals with the mutually-orthogonal linear polarizations. Applying the correction may include applying multiple corrections to the multiple sets of the first and second copies, respectively. Additionally or alternatively, applying the correction may include applying the correction to a given set of the first and second copies based on a group of the first and second downlink signals corresponding to another set of the first and second copies, different from the given set. In some embodiments, applying the correction includes increasing a power of combined signal generated by a combination of the first and second downlink signals in the coverage region.

There is additionally provided, in accordance with an embodiment of the present invention, a communication apparatus, including:

an antenna; and a calibration receiver, which is located in a coverage region of a satellite that includes first and second satellite transponders, and which is configured to receive using the antenna first and second downlink signals having mutually-orthogonal linear polarizations that are transmitted respectively by the first and second satellite transponders in response to first and second copies of a signal that were transmitted respectively toward the first and second satellite transponders by an uplink transmitter, and to cause the uplink transmitter to apply to at least one of the first and second copies a correction, which is selected based on the received first and second downlink signals so as to remove a frequency offset between the first and second downlink signals and cause the first and second downlink signals to have a constant phase offset in at least some of the coverage region.

There is also provided, in accordance with an embodiment of the present invention, a communication system, including:

an uplink transmitter, which is configured to transmit first and second copies of a signal toward first and second satellite transponders, respectively, so as to cause the first and second satellite transponders to transmit respective first and second downlink signals with mutually-orthogonal linear polarizations toward a coverage region;

a calibration receiver, which is configured to receive the first and second downlink signals and to cause the uplink transmitter to apply to at least one of the first and second copies a correction, which is selected based on the received first and second downlink signals so as to remove a frequency offset between the first and second downlink signals and cause the first and second downlink signals to have a constant phase offset in at least some of the coverage region; and at least one receiver, which is configured to receive a combined signal, generated by a combination of the first and second downlink signals, using a linearly-polarized antenna.

The present invention will be more fully understood from the following detailed description of the embodiments thereof, taken together with the drawings in which:

DETAILED DESCRIPTION OF EMBODIMENTS

Overview

Figure 1:
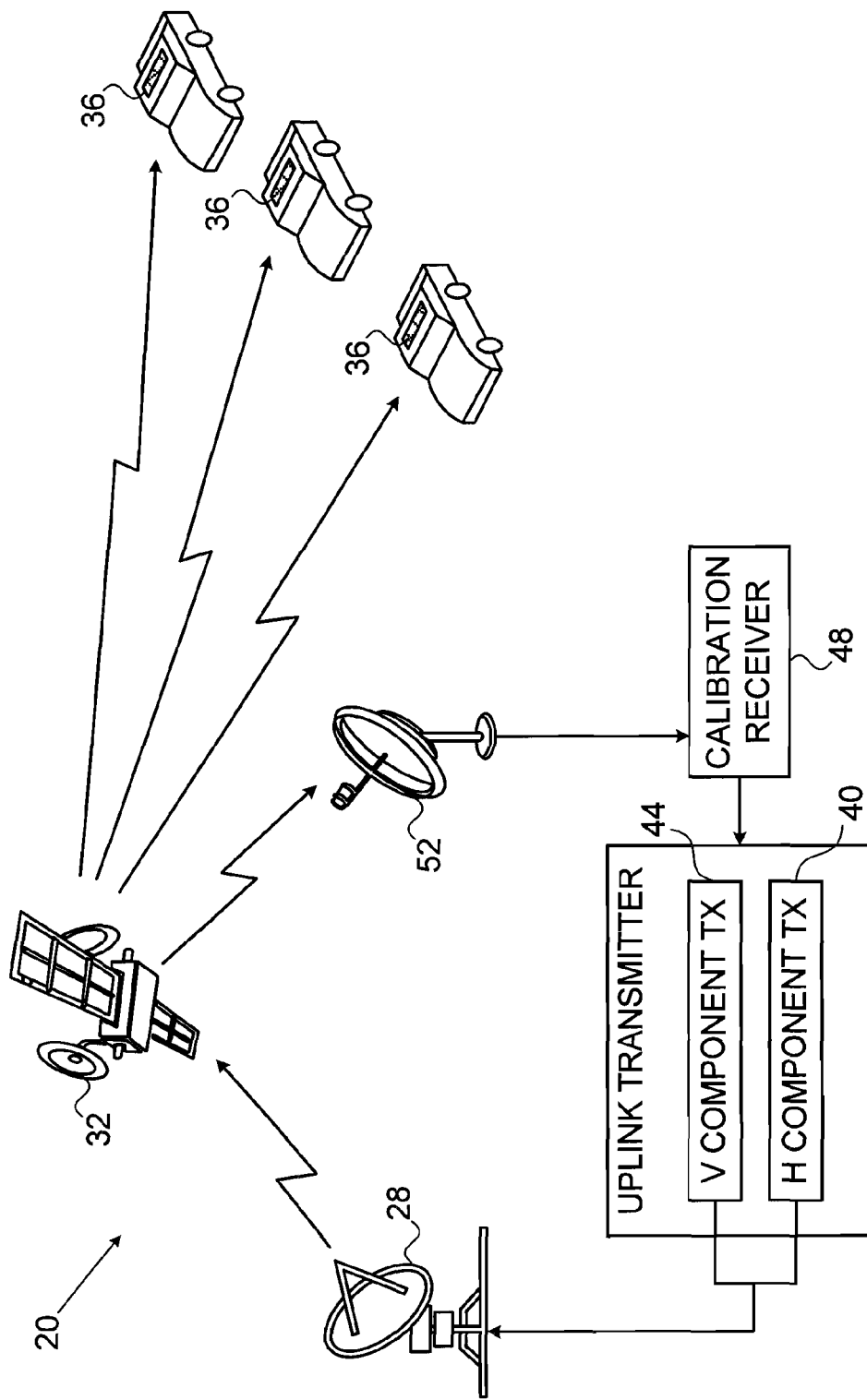
FIG. 1 is a schematic, pictorial illustration of a satellite communication system, in accordance with an embodiment of the present invention.

Some communication satellites contain transponders that transmit downlink signals at mutually-orthogonal linear polarizations. For example, some satellites contain one or more vertically-polarized transponders and one or more horizontally-polarized transponders. Typically, each individual transponder cannot exceed a certain maximum transmit power level. As a result, the power at which the downlink signal is received from a given transponder is limited, and may be below the sensitivity of some receivers.

Embodiments of the present invention that are described hereinbelow provide improved methods and systems for satellite communication. In some embodiments, an uplink transmitter transmits two copies of a signal via two respective satellite transponders having mutually-orthogonal polarizations (typically a vertically-polarized transponder and a horizontally-polarized transponder). In response to these uplink signals, the two satellite transponders transmit respective downlink signals toward a certain coverage region on the earth's surface. The two downlink signals combine at the coverage region to produce a combined, linearly-polarized signal. Receivers located in the coverage region may receive the combined signal using linearly-polarized antennas.

The uplink transmitter applies pre-correction to at least one of the two copies of the signal before transmission to the satellite. The pre-correction is computed so as to reduce a frequency offset between the two downlink signals, and to cause the downlink signal to have a substantially constant phase offset in at least some of the coverage region. This sort of correction causes the two downlink signals from the two transponders to combine coherently at the coverage region, and therefore to increase the power of the combined signal. The pre-correction may involve phase, frequency and/or delay correction. In some embodiments, the pre-correction is computed by a calibration receiver, which receives the two downlink signals, compares them to one another and estimates the appropriate correction. In many cases, the pre-correction varies over time, for example when the two transponders in question perform frequency conversion using independent Local Oscillator (LO) signals.

In summary, the disclosed methods and systems transmit a given signal toward the coverage region using the combined transmit power of two satellite transponders. Receivers in the coverage region that receive each transponder separately below the specified sensitivity level may receive the combined signal at a higher level, which enables successful reception. The methods and systems described herein are therefore particularly applicable to mobile satellite terminal applications, since they enable reducing the size and cost of the mobile terminals' antennas. The disclosed techniques can also enable mobile terminals to receive signals from lower-power satellites and/or end-of-life geostationary satellites that develop an inclined orbit.

System Description

FIG. 1 is a schematic, pictorial illustration of a satellite communication system 20, in accordance with an embodiment of the present invention. System 20 comprises an uplink transmitter 24, typically part of a hub, which transmits uplink signals via a hub antenna 28 to a satellite 32. The satellite converts the uplink signals into respective downlink signals, and transmits the downlink signals to satellite receivers 36 located in a certain coverage region. In the present example, system 20 is used for transmitting digital video and providing high-speed Internet access to receivers of mobile terminals fitted in vehicles.

Satellite 32 comprises at least two transponders that transmit at mutually-orthogonal polarizations. (The transponders are not shown in FIG. 1 but are described in detail in FIG. 2 below.) In the present example, satellite 32 comprises at least one vertically-polarized (V) transponder and at least one horizontally-polarized (H) transponder. The description that follows focuses on two transponders, although real-life satellites typically comprise multiple vertically-polarized and horizontally-polarized transponders.

Uplink transmitter 24 transmits two copies of a given uplink signal (e.g., a given video channel) via two respective mutually-orthogonal transponders. This sort of transmission causes the satellite to transmit two downlink signals from the two transponders, respectively. Assuming the relative phase, frequency and delay between the two downlink signals are set appropriately, the two downlink signals combine coherently at the coverage area. The two downlink signals combine in-phase to produce a linearly-polarized combined signal, which best exploits the transmit power of the two transponders.

Figure 6:
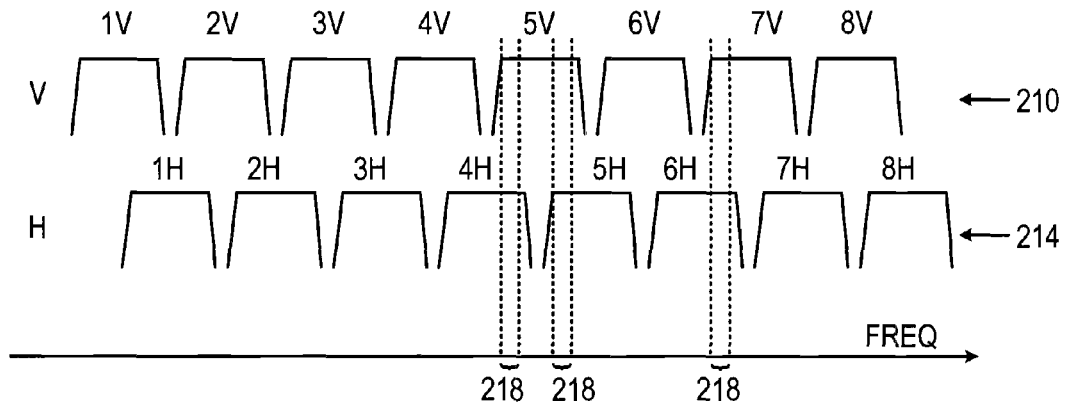
FIG. 6 is a graph that schematically illustrates frequency allocations in a satellite communication system, in accordance with an embodiment of the present invention.

The technique of combining the signals transmitted from two orthogonal linearly-polarized antennas to produce a combined linearly-polarized signal is described, for example, by Kraus in "Antennas," McGraw-Hill, second edition, 2001, section 2.1, page 70, which is incorporated herein by reference. The two transponders in question are assumed to have at least some overlapping spectrum, so that they can transmit the two downlink signals on the same frequency. Many satellite configurations support this assumption, i.e., have some bandwidth that is common to the vertically-polarized and horizontally-polarized transponders. An example of such a frequency allocation is shown in FIG. 6 below.

Uplink transmitter 24 comprises an H-component transmitter 40 that transmits one copy of the signal to the horizontally-polarized transponder of the satellite, and a V-component transmitter 44 that transmits a second copy of the signal to the vertically-polarized transponder.

System 20 comprises a synchronous calibration receiver 48, which estimates a phase, frequency and/or delay pre-correction that should be applied between the two signal copies in order to increase and attempt to maximize the power of the combined signal. The estimated pre-correction causes the two downlink signals (which subsequently form the combined signal) to have a substantially constant phase and removes the frequency offset between them. Calibration receiver 48 causes uplink transmitter 24 to apply the estimated pre-correction by controlling at least one of transmitters 40 and 44. Typically, calibration receiver 48 is located in the relevant coverage region. The calibration receiver receives the two downlink signals from the vertically-polarized and horizontally-polarized transponders using a calibration antenna 52, and compares the downlink signals to one another in order to assess the appropriate pre-correction. Several example configurations for implementing calibration receiver 48 are described in FIGS. 3-5 below.

The system configuration shown in FIG. 1 is an example configuration, which is chosen purely for the sake of conceptual clarity. In alternative embodiments, any other suitable system configuration can also be used. For example, receivers 36 may be implemented in mobile or stationary satellite terminals, which may be fitted in vehicles or in any other suitable platforms. Although the embodiments described herein refer mainly to forward link communication (i.e., transmission of signals to the terminals), the system may also support a reverse link for transmitting from the terminals to a central hub. Further aspects of satellite communication via multiple transponders are described in U.S. Patent Application Publication 2009/0061760, whose disclosure is incorporated herein by reference.

Figure 2:
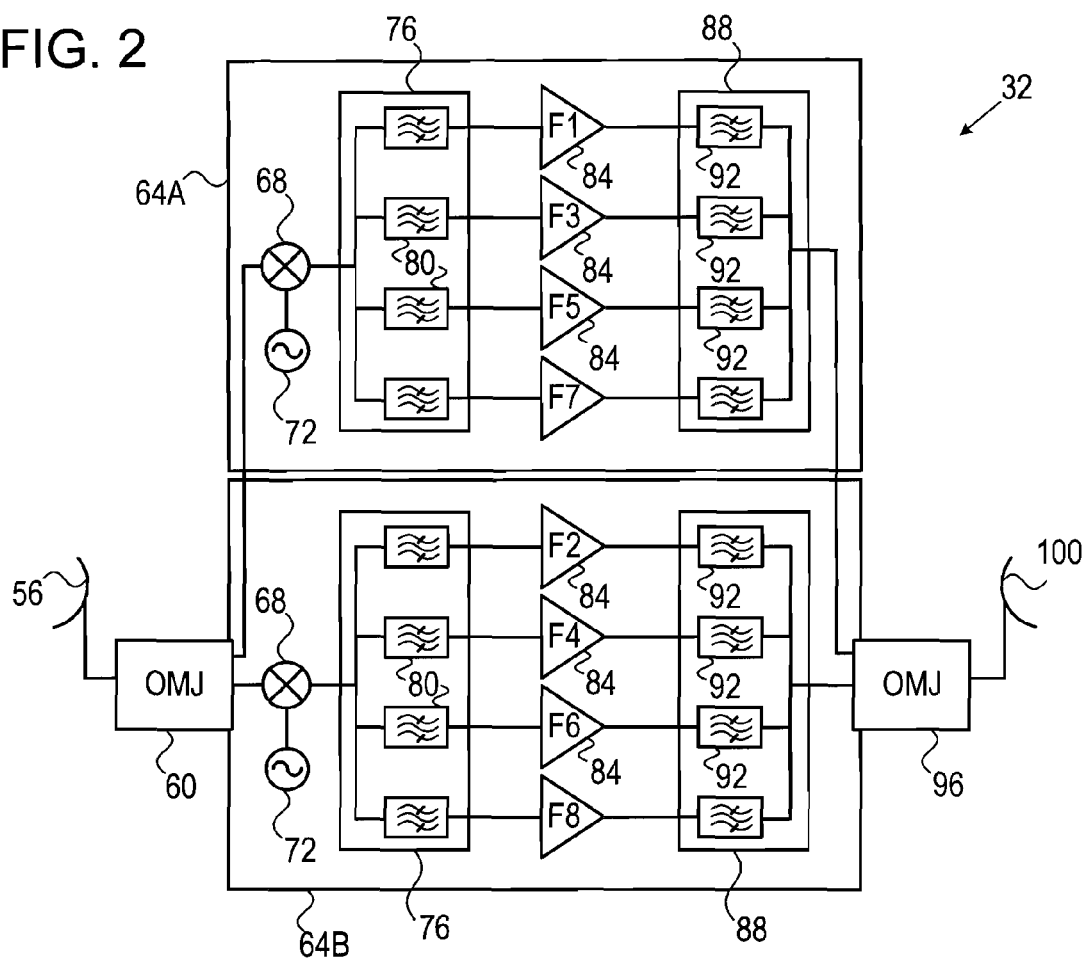
FIG. 2 is a block diagram that schematically illustrates a satellite that is used by a satellite communication system, in accordance with an embodiment of the present invention.

FIG. 2 is a block diagram that schematically illustrates satellite 32 used by system 20, in accordance with an embodiment of the present invention. Typically although not necessarily, satellite 32 comprises a geostationary or geosynchronous satellite. In the present example, satellite 32 receives uplink signals from uplink transmitter 24 via a cross-polarized uplink antenna 56. An Orthogonal Mode Junction (OMJ) 60 separates the horizontally-polarized signals from the vertically-polarized signals. The horizontally-polarized signals are processed by a horizontal polarization (H) transponder 64A, and the vertically-polarized signals are processed by a vertical polarization (V) transponder 64B.

In each transponder, a mixer 68 converts the signal frequency from the uplink frequency band to the downlink frequency band. In the present example, the uplink frequencies are in the range of 14-14.5 GHz and the downlink frequencies are in the 12 GHz band, although any other suitable bands can also be used. Each mixer 68 performs frequency conversion by mixing the signal with a Local Oscillator (LO) signal that is produced by a respective LO generator 72.

In each transponder, the frequency-converted signal is filtered and channelized by an input multiplexer (IMUX) 76, which comprises multiple band-pass filters 76. In the present example, the channels are denoted F1 ... F8, transponder 64A is assigned channels F1, F3, F5 and F7, and transponder 64B is assigned channels F2, F4, F6 and F8. The signal of each channel is amplified by a respective amplifier 84. The amplified signals in each transponder are filtered and combined by an output multiplexer (OMUX) 88, which comprises multiple band-pass filters 92. The outputs of transponders 64A and 64B are provided to an OMJ 96, which produces a horizontally-polarized downlink signal and a vertically-polarized downlink signal, respectively. The two orthogonally-polarized downlink signals are transmitted toward the coverage region by a cross-polarized downlink antenna 100.

The satellite configuration shown in FIG. 2 is an example configuration, which is chosen purely for the sake of conceptual clarity. In alternative embodiments, system 20 can use any other suitable satellite configuration. In particular, in the satellite configuration of FIG. 2, LO generators 72 of transponders 64A and 64B are not synchronized or locked to any common reference clock. Therefore, the downlink signals transmitted from the two transponders may have a relative frequency error caused by frequency deviations between the LO generators. The relative frequency error may vary over time. This relative frequency error, as well as other errors that are addressed below, is pre-corrected by the methods and systems described herein.

In alternative embodiments, the LO generators of different transponders may be locked to a common reference clock, or the transponders may use a common LO generator. In these embodiments, there is substantially no relative frequency error between the downlink signals. Nevertheless, relative phase and/or delay errors may still exist between the two downlink signals, for example because of differences in the phase or amplitude transfer function of the two transponders. Such relative phase and delay errors, which may vary over time, can also be pre-corrected by the methods and systems described herein.

Calibration Receiver Configurations

Figure 3:
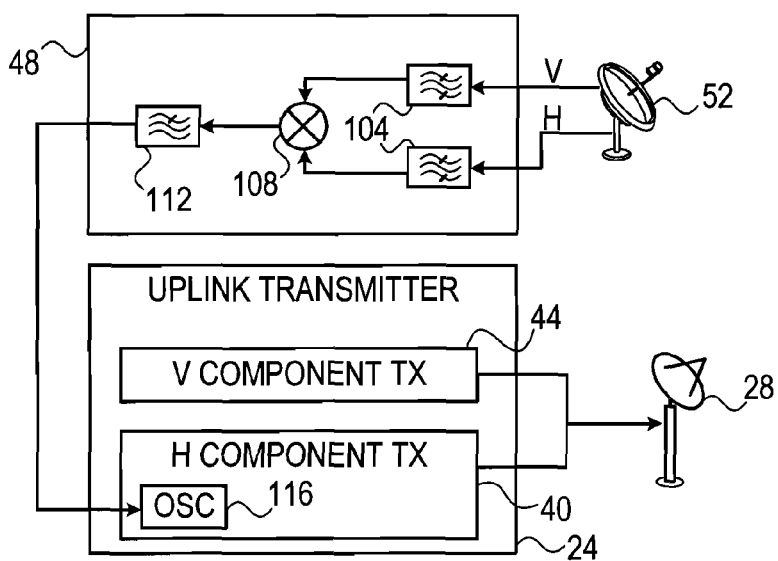
FIG. 3 is a block diagram that schematically illustrates a calibration receiver and an uplink transmitter, in accordance with an embodiment of the present invention.

FIG. 3 is a block diagram that schematically illustrates calibration receiver 48 and uplink transmitter 24, in accordance with an embodiment of the present invention. FIG. 3 demonstrates an example technique for estimating the relative phase error between the two downlink signals, and for pre-correcting the uplink signals in order to compensate for this error.

In the present example, calibration antenna 52 receives the downlink signals transmitted by the H and V transponders in satellite 32, as described above. Antenna 52 comprises an orthogonal feed, which separates and outputs the horizontally-polarized downlink signal (transmitted from transponder 64A) and the vertically-polarized downlink signal (transmitted from transponder 64A). The horizontally-polarized and vertically-polarized downlink signals are typically modulated, e.g., using Binary Phase Shift Keying (BPSK) or any other suitable modulation.

The horizontally-polarized and vertically-polarized downlink signals are filtered by respective band-pass filters 104, and are then mixed with one another by a mixer 108. The output of mixer 108 is filtered by a low-pass filter 112. Mixer 108 functions as a phase comparator, and its average output (and thus the output of filter 112) is indicative of the phase difference between the horizontally-polarized and vertically-polarized downlink signals.

The output of filter 112 is used as a control signal, which pre-corrects one or both of the copies of the uplink signal transmitted by uplink transmitter 24. In the example of FIG. 3, H-component transmitter 40 in uplink transmitter 24 comprises a crystal oscillator 116, which determines the up-conversion frequency of the H-component transmitter. The output of filter 112 is used to modify the frequency of crystal oscillator 116, and therefore controls the frequency of the signal copy transmitted by H-component transmitter 40. Since the frequency of V-component transmitter 44 is not controlled in this manner, this scheme modifies the relative frequency difference between the two signal copies transmitted to the satellite. As a result, the relative phase and frequency between the two signal copies transmitted by uplink transmitter 24 are pre-corrected. The pre-correction causes the horizontally-polarized and vertically-polarized downlink signals transmitted respectively from transponders 64A and 64B to combine in-phase at the coverage region. A receiver 36 may receive the combined signal using a linearly-polarized antenna, so as to exploit the combined power of the two transponders.

In alternative embodiments, the output of filter 112 can be used to control the frequency of the V-component transmitter instead of the H-component transmitter. Alternatively, the frequencies of both transmitters 40 and 44 can be modified based on the output of filter 112. Further alternatively, any other suitable scheme, which pre-corrects the relative phase or frequency between transmitters 40 and 44 based on the estimated relative phase or frequency difference between the two downlink signals, can also be used.

In some embodiments, the cutoff frequency of filter 112 is set at a very low frequency, e.g., on the order of 1 Hz or less. This choice of cutoff frequency reduces the effective bandwidth of calibration receiver 48, and therefore enables the receiver to operate at very low signal levels, e.g., below −150 dBm. Such a narrow effective bandwidth also enables to compensate for relatively large feedback delays (large uplink and/or downlink delays as well as large processing delays in the satellite). Alternatively, any other suitable cutoff frequency or effective bandwidth can be used for implementing receiver 48.

Figure 4:
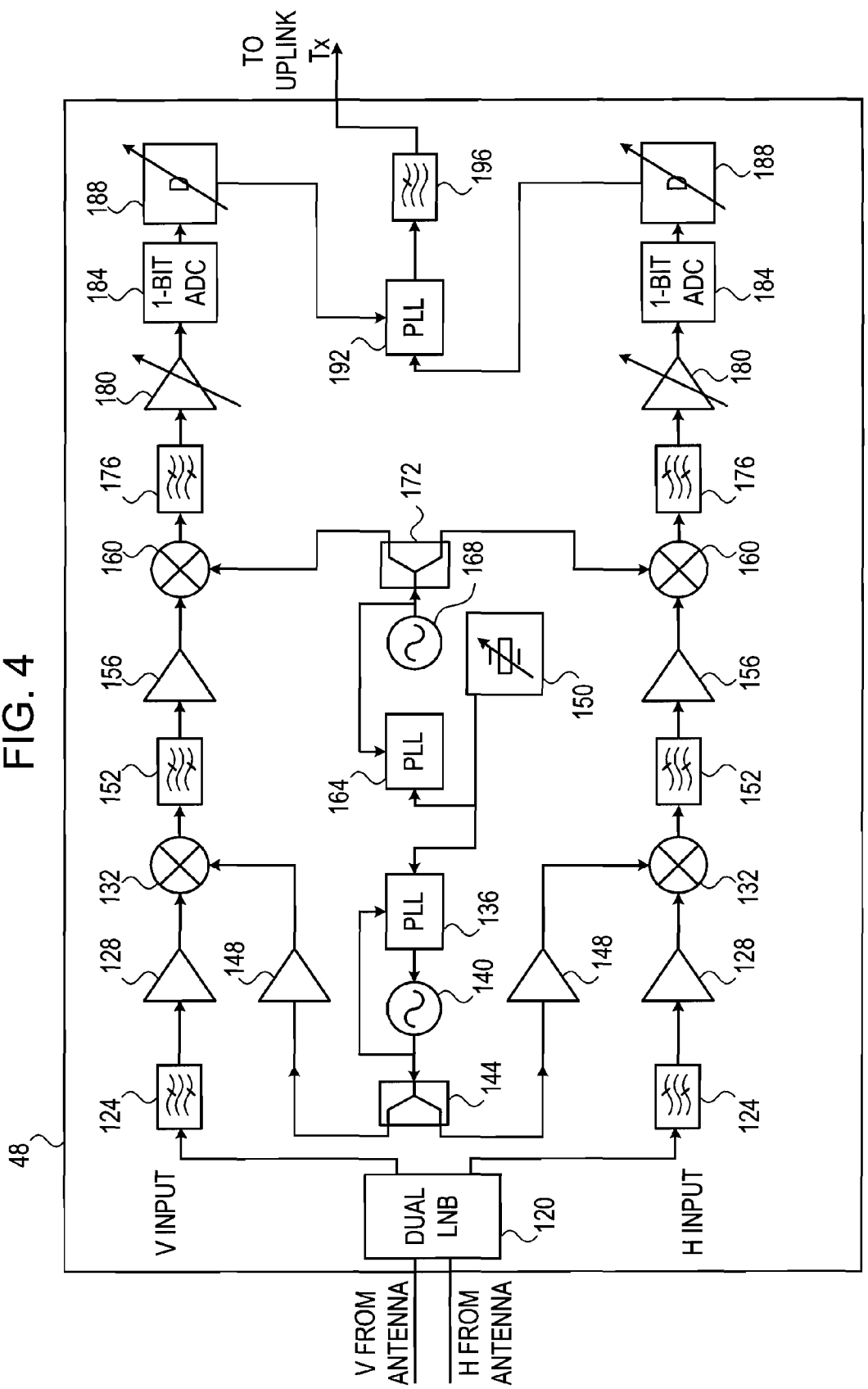
FIGS. 4 and 5 are block diagrams that schematically illustrate calibration receivers, in accordance with embodiments of the present invention.

FIG. 4 is a block diagram that schematically illustrates an example implementation of calibration receiver 48, in accordance with an embodiment of the present invention. In the example of FIG. 4, the horizontally-polarized and vertically-polarized downlink signals received by antenna 52 are initially down-converted by a dual Low Noise Block (LNB) down-converter 120, to produce two respective Intermediate Frequency (IF) signals. These signals are denoted "H INPUT" and "V INPUT" in the figure. The dual LNB typically uses a common LO signal for down-converting both downlink signals, so as to avoid causing frequency offsets between the down-conversion frequencies. In some case, LNB 120 may still introduce a constant phase difference. Each of the two IF signals is filtered by a respective filter 124, amplified by a respective amplifier 128, and then further down-converted by a respective mixer 132.

The LO signal that drives mixers 132 is produced by a Phase-Locked Loop 136 that controls an oscillator 140. The output of oscillator 140 is split by a power divider 144, whose two outputs are amplified by LO amplifiers 148 and provided to the LO ports of mixers 132. PLL 136 is locked to the frequency of a crystal oscillator 150. Mixers 132 down-convert the two IF signals to a lower IF, e.g., in the 800 MHz range or in any other suitable frequency range.

The outputs of mixers 132 are filtered by respective image rejection filters 152, such as Surface Acoustic Wave (SAW) filters, and then amplified by respective amplifiers 156. The outputs of amplifiers 156 are further down-converted by respective mixers 160. The LO signal that drives mixers 160 is produced by a Phase-Locked Loop 164 that controls an oscillator 168. The output of oscillator 168 is split by a power divider 172, whose two outputs are provided to the LO ports of mixers 160. PLL 164 is also locked to the frequency of crystal oscillator 150.

The outputs of mixers 160 are filtered by respective band-pass channel filters 176. In some embodiments, filters 176 are centered around 700 MHz and their bandwidth is chosen according to the bandwidth of the modulated downlink signals. Generally, however, any suitable filter characteristics can be used. The outputs of channel filters 176 are amplified by respective variable-gain amplifiers 180, whose gain is typically adjusted based on the received signal strength. The outputs of amplifiers 180 are sampled by respective 1-bit Analog-to-Digital Converters (ADCs) 184, typically implemented using comparators. The ADC outputs are delayed by respective programmable delay circuits 188, which are typically adjusted to compensate for the phase delay mismatch between the horizontally-polarized and vertically-polarized downlink signals.

The outputs of delay circuits 188 are compared to one another by a PLL 192, whose output is filtered by a low-pass filter 196. The cutoff frequency of filter 196 is typically chosen to be low, as explained with regard to filter 112 of FIG. 3 above. The output of filter 196 is used as a control signal, which pre-corrects the relative phase or frequency between the copies of the uplink signal transmitted by uplink transmitter 24. The output of filter 196 can be used to apply pre-correction in transmitter 24 using any suitable method, such as the methods described with regard to FIG. 3 above.

The circuit configuration of FIG. 4 is an example configuration, which is chosen purely for the sake of conceptual clarity. In alternative embodiments, any other suitable configuration can also be used.

Figure 5:
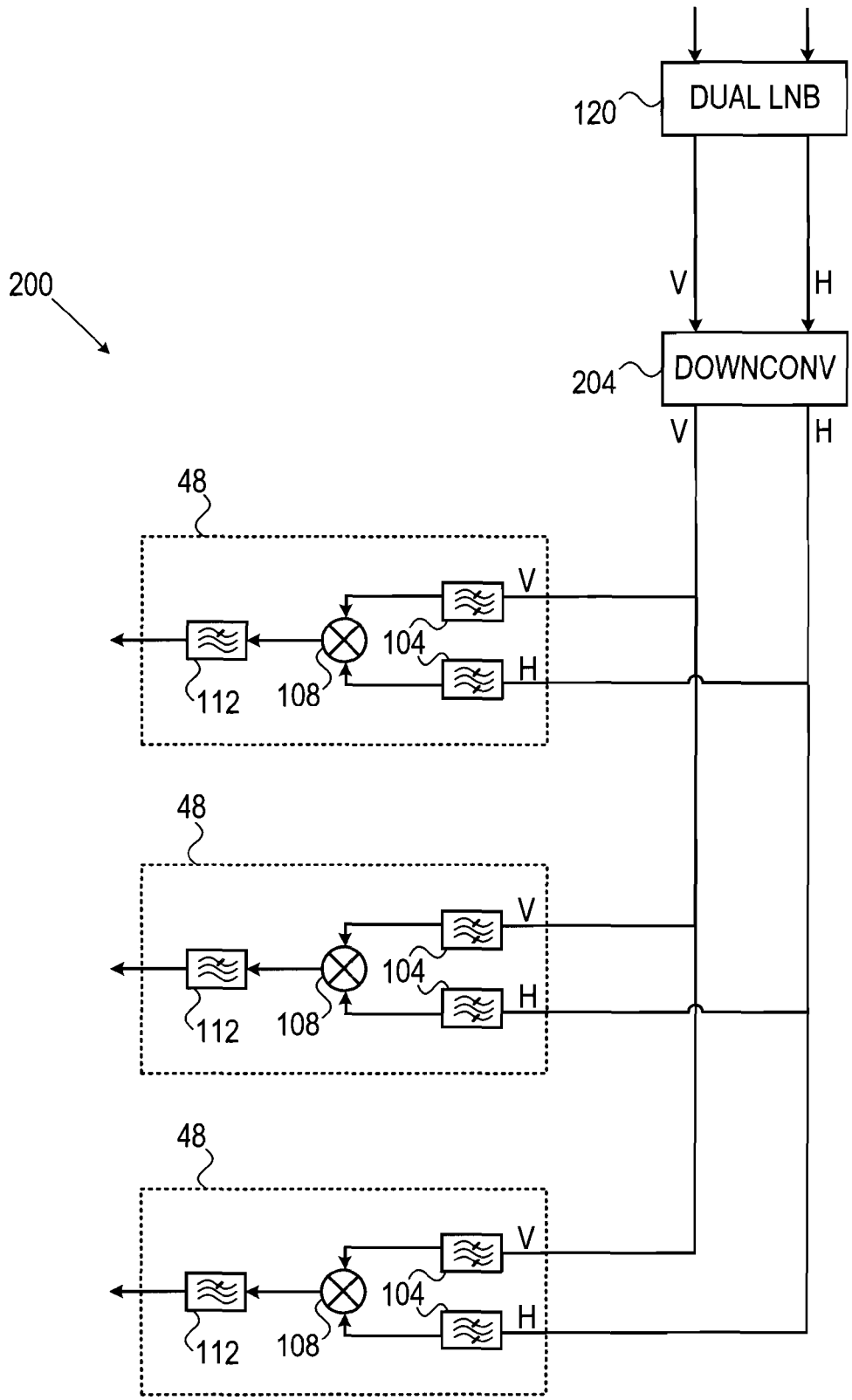

FIG. 5 is a block diagram that schematically illustrates a calibration receiver 200, in accordance with an alternative embodiment of the present invention. In the present example, calibration receiver 200 controls two or more pairs of orthogonally-polarized transponders. Generally, each pair of orthogonally-polarized transponders may have a different relative phase or frequency error. Therefore, receiver 200 comprises multiple calibration receivers 48, each receiver similar to receiver 48 of FIG. 3 above. The output of each receiver 48 in FIG. 5 is used for pre-correcting the signal copies transmitted via a respective pair of orthogonally-polarized transponders. Pairs of uplink signal copies that are transmitted via different transponder pairs potentially carry different data. Since each pair of uplink signals is pre-corrected individually, the pre-correction can better match the individual phase or frequency errors in that transponder pair. Some of the functions of receiver 200 can be performed jointly for the different channels. For example, dual LNB 120 may be common to all channels, as well as a broadband down-conversion block 204.

In some embodiments, the calibration receiver compares the orthogonally-polarized downlink signals on a given channel (referred to as a master channel), and uses this comparison to apply uplink pre-correction on another channel (referred to as a secondary channel).

Frequency Allocation Considerations

As noted above, a pair of orthogonally-polarized transponders should have at least some overlapping spectrum in order to carry out the disclosed methods. This constraint typically affects the choice of uplink and downlink frequencies selected for the signals in system 20. The selection of frequencies should typically consider the specific frequency allocation used by the transponders in the satellite in question.

FIG. 6 is a graph that schematically illustrates frequency allocations in a typical satellite that can be used by system 20, in accordance with an embodiment of the present invention. In this example, the satellite comprises eight vertically-polarized transponders denoted 1V . . . 8V, and eight horizontally-polarized transponders denoted 1H . . . 8H. A graph 210 shows the frequency bands allocated to the vertically-polarized transponders, and a graph 214 shows the frequency bands allocated to the horizontally-polarized transponders.

In order for a given spectral band to be used in the methods described herein, the spectral band should be allocated to at least one vertically-polarized transponder and at least one horizontally-polarized transponder. Spectral bands 218 indicate several examples of spectral bands that meet this overlap condition. In one example embodiment, the bandwidth of each transponder is 43 MHz and the gap between adjacent transponders of the same polarization is 6 MHz. In this example, the bandwidth of each spectral band 218 is (43−6)/2=18.5 MHz.

Calibration Method Description

Figure 7:
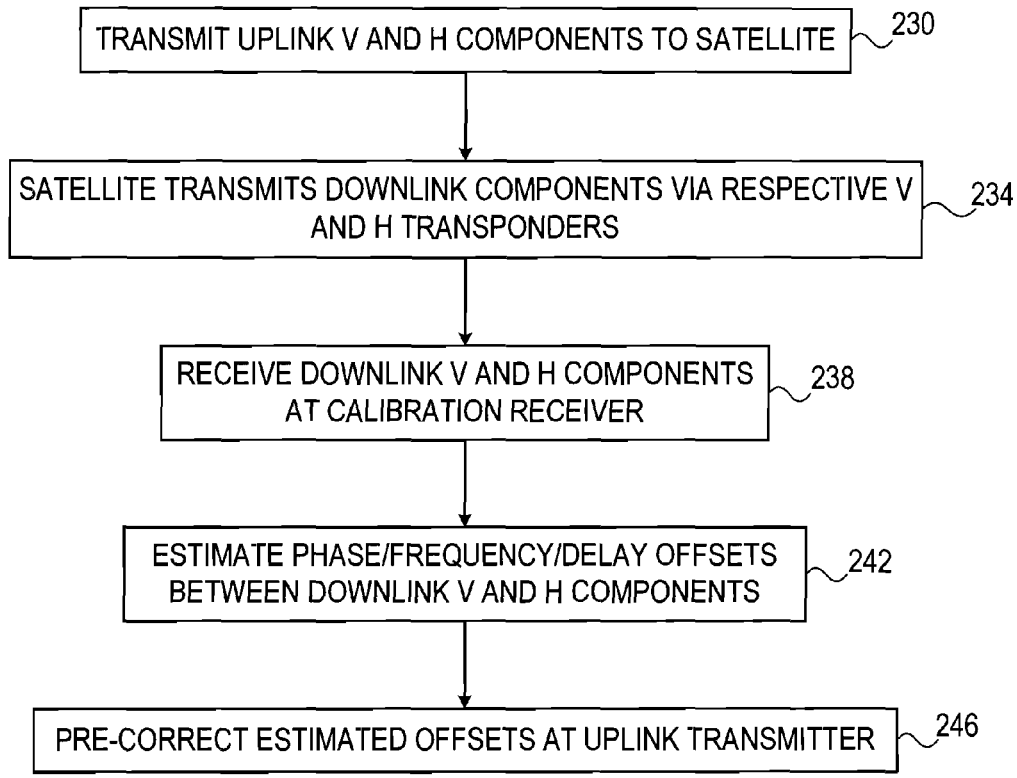
FIG. 7 is a flow chart that schematically illustrates a method for satellite communication, in accordance with an embodiment of the present invention.

FIG. 7 is a flow chart that schematically illustrates a method for satellite communication, in accordance with an embodiment of the present invention. The method begins with uplink transmitter 24 transmitting two copies of a given uplink signal to respective orthogonally-polarized transponders on satellite 32, at an uplink transmission step 230. In the present example, the two copies of the signal are transmitted as a horizontally-polarized uplink signal and a vertically-polarized uplink signal by H-component transmitter 40 and V-component transmitter 44, respectively.

The horizontally-polarized and vertically-polarized uplink signals are processed by transponders 64A and 64B of satellite 32, as explained above. Transponders 64A and 64B respectively convert the horizontally-polarized and vertically-polarized uplink signals into horizontally-polarized and vertically-polarized downlink signals, and the satellite transmits the two downlink signals toward the coverage region, at a downlink transmission step 234.

Calibration receiver 48 receives the horizontally-polarized and vertically-polarized downlink signals, at a calibration reception step 238. The calibration receiver compares the received horizontally-polarized and vertically-polarized downlink signals, so as to estimate the relative phase, frequency and/or delay between them, at an error estimation step 242. The calibration receiver then causes uplink transmitter 24 to pre-correct at least one of the two signal copies, based on the estimated phase, frequency and/or delay error, at a pre-correction step 246.

As explained above, the pre-correction causes the horizontally-polarized and vertically-polarized downlink signals transmitted respectively from transponders 64A and 64B to combine in-phase at the coverage region. A receiver 36 may receive the combined signal using a linearly-polarized antenna, and thus exploit the combined power of the two transponders. In some cases, each individual downlink signal (from transponder 64A or 64B) is received at a given receiver at a level that is below the specified sensitivity of the receiver. The combined signal, however, may be above the specified sensitivity and may therefore be decoded successfully.

Additional Considerations

The description above assumes that the phase centers of the satellite antennas that transmit the two orthogonally-polarized downlink signals are approximately collocated. When this condition is met, a linearly-polarized combined signal and good cross-polarization can be achieved between the two orthogonally-polarized downlink signals over a relatively large coverage region. If, on the other hand, the satellite downlink antennas are not collocated, good cross-polarization may be achieved only in the geographical vicinity of calibration receiver 48, and the cross-polarization may degrade considerably for receivers 36 that are distant from the calibration receiver.

In the latter case (i.e., non-collocated satellite antennas), the combined downlink signal will typically have an elliptical polarization whose parameters vary with location coordinates within the coverage region. In order to receive such a signal properly, the reception antenna of receiver 36 may need to be oriented based on the receiver location in order to match the specific polarization of the combined signal at this location. This adjustment typically considers the orientation of the ellipse major axis and the axial ratio of the specific elliptical polarization.

In some embodiments, receiver 36 orients its reception antenna using a polarization tracking mechanism that tracks the polarization of the received signal. In alternative embodiments, receiver 36 may orient its antenna by measuring its geographical location, such as using a built-in Global Positioning System (GPS) receiver or any other suitable location measurement means.

Even if the combined downlink signal has a perfect linear polarization over the entire coverage region (e.g., when the satellite downlink antennas are collocated and the relative phase between the downlink signals is pre-corrected properly), the polarization inclination of the combined signal may vary with location. This variation is caused, for example, by differences in the angle at which the satellite is viewed from different geographical locations, and/or differences in the satellite antenna footprint and actual transponder transmit power at different locations. In some embodiments, receiver 36 orients its reception antenna so as to match the polarization inclination of the combined signal. As explained above, the receiver may orient its antenna by tracking the actual polarization inclination of the received signal, or based on receiver location measurements (e.g., GPS measurements).

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
transmitting first and second copies of a signal toward first and second satellite transponders, respectively, so as to cause the first and second satellite transponders to transmit respective first and second downlink signals with mutually-orthogonal linear polarizations toward a coverage region; and
before transmitting the first and second copies, applying to at least one of the first and second copies a correction, which comprises at least one correction type selected from a group of types consisting of a phase correction, a frequency correction and a delay correction, and which is selected so as to remove a frequency offset between the first and second downlink signals and cause the first and second downlink signals to have a constant phase offset in at least some of the coverage region.

2. The method according to claim 1, wherein a combined signal generated by a combination of the first and second downlink signals in the at least some of the coverage region comprises a linearly-polarized signal.

3. The method according to claim 1, wherein applying the correction comprises compensating for a relative frequency error between local oscillators of the first and second satellite transponders.

4. The method according to claim 1, wherein applying the correction comprises receiving the first and second downlink signals, comparing the received first and second downlink signals so as to estimate the correction, and applying the estimated correction to the at least one of the first and second copies.

5. The method according to claim 4, wherein comparing the received first and second downlink signals comprises mixing the received first and second downlink signals using a phase comparator so as to estimate a phase difference between the received first and second downlink signals.

6. The method according to claim 1, wherein applying the correction comprises adjusting a frequency source used for up-converting the at least one of the first and second copies for transmission.

7. The method according to claim 1, and comprising receiving and decoding a combined signal, generated by a combination of the first and second downlink signals, by a given receiver having a linearly-polarized antenna in the coverage region.

8. The method according to claim 7, wherein each of the first and second downlink signals separately is received at the given receiver below a specified sensitivity level, and wherein applying the correction comprises causing the combined signal to be received at the given receiver above the specified sensitivity level.

9. The method according to claim 7, wherein receiving the combined signal comprises orienting the linearly-polarized antenna of the given receiver to match a polarization inclination of the combined signal.

10. The method according to claim 7, wherein receiving the combined signal comprises orienting the linearly-polarized antenna of the given receiver to match an elliptical polarization of the combined signal.

11. The method according to claim 1, wherein transmitting the copies comprises transmitting multiple sets of the first and second copies of multiple respective signals, so as to cause the first and second satellite transponders to transmit respective multiple groups of the first and second downlink signals with the mutually-orthogonal linear polarizations.

12. The method according to claim 11, wherein applying the correction comprises applying multiple corrections to the multiple sets of the first and second copies, respectively.

13. The method according to claim 11, wherein applying the correction comprises applying the correction to a given set of the first and second copies based on a group of the first and second downlink signals corresponding to another set of the first and second copies, different from the given set.

14. The method according to claim 1, wherein applying the correction comprises increasing a power of combined signal generated by a combination of the first and second downlink signals in the coverage region.

15. A communication apparatus, comprising:
an antenna; and
a calibration receiver, which is located in a coverage region of a satellite that includes first and second satellite transponders, and which is configured to receive using the antenna first and second downlink signals having mutually-orthogonal linear polarizations that are transmitted respectively by the first and second satellite transponders in response to first and second copies of a signal that were transmitted respectively toward the first and second satellite transponders by an uplink transmitter, and to cause the uplink transmitter to apply to at least one of the first and second copies a correction, which comprises at least one correction type selected from a group of types consisting of a phase correction, a frequency correction and a delay correction, and which is selected based on the received first and second downlink signals so as to remove a frequency offset between the first and second downlink signals and cause the first and second downlink signals to have a constant phase offset in at least some of the coverage region.

16. The apparatus according to claim 15, wherein the calibration receiver is configured to cause the uplink transmitter to compensate for a relative frequency error between local oscillators of the first and second satellite transponders.

17. The apparatus according to claim 15, wherein the calibration receiver is configured to compare the received first and second downlink signals so as to estimate the correction.

18. The apparatus according to claim 17, wherein the calibration receiver comprises a phase comparator, which is configured to mix the received first and second downlink signals so as to estimate a phase difference between the received first and second downlink signals.

19. The apparatus according to claim 15, wherein the calibration receiver is configured to cause the uplink transmitter to adjust a frequency source used for up-converting the at least one of the first and second copies for transmission.

20. The apparatus according to claim 15, wherein the calibration receiver is configured to receive multiple groups of the first and second downlink signals with the mutually-orthogonal linear polarizations, which are transmitted from the satellite in response to respective multiple sets of the first and second copies of multiple respective signals.

21. The apparatus according to claim 20, wherein the calibration receiver is configured to cause the uplink transmitter to apply multiple corrections to the multiple sets of the first and second copies, respectively.

22. The apparatus according to claim 20, wherein the calibration receiver is configured to cause the uplink transmitter to apply the correction to a given set of the first and second copies based on a group of the first and second downlink signals corresponding to another set of the first and second copies, different from the given set.

23. The apparatus according to claim 15, wherein the correction causes an increase in a power of combined signal generated by a combination of the first and second downlink signals in the coverage region.

24. A communication system, comprising:
an uplink transmitter, which is configured to transmit first and second copies of a signal toward first and second satellite transponders, respectively, so as to cause the first and second satellite transponders to transmit respective first and second downlink signals with mutually-orthogonal linear polarizations toward a coverage region;
a calibration receiver, which is configured to receive the first and second downlink signals and to cause the uplink transmitter to apply to at least one of the first and second copies a correction, which comprises at least one correction type selected from a group of types consisting of a phase correction, a frequency correction and a delay correction, and which is selected based on the received first and second downlink signals so as to remove a frequency offset between the first and second downlink signals and cause the first and second downlink signals to have a constant phase offset in at least some of the coverage region; and
at least one receiver, which is configured to receive a combined signal, generated by a combination of the first and second downlink signals, using a linearly-polarized antenna.

* * * * *